United States Patent [19]

Schiller

[11] Patent Number: 4,759,078
[45] Date of Patent: Jul. 19, 1988

[54] COORDINATED LOCAL OSCILLATOR RECEIVING SYSTEM

[75] Inventor: Thomas H. Schiller, Los Altos, Calif.

[73] Assignee: Rose Communication Systems, Inc., San Jose, Calif.

[21] Appl. No.: 931,338

[22] Filed: Nov. 14, 1986

[51] Int. Cl.⁴ .......................... H04B 1/00; H04B 1/10
[52] U.S. Cl. ...................................... 455/49; 455/208; 455/265; 455/317
[58] Field of Search ....................... 455/39, 49, 55, 57, 455/132, 140, 141, 206, 208, 209, 255, 265, 317, 88, 89; 331/2, 46, 47

[56] References Cited

U.S. PATENT DOCUMENTS

| | | | |
|---|---|---|---|
| 3,609,579 | 9/1971 | Chappell | 331/46 |
| 4,218,655 | 8/1980 | Johnston et al. | 455/39 |
| 4,276,638 | 6/1981 | Andreucci et al. | 455/57 |
| 4,361,906 | 11/1982 | Sakamoto | 455/140 |
| 4,403,343 | 9/1983 | Hamada | 455/140 |
| 4,453,138 | 6/1984 | Scheer | 331/47 |
| 4,521,745 | 6/1985 | Falconer | 331/2 |
| 4,585,903 | 4/1986 | Schiller et al. | 179/2 EA |
| 4,651,103 | 3/1987 | Grimes | 331/47 |

Foreign Patent Documents 1469419 7/1974 United Kingdom .

Primary Examiner—Michael A. Masinick
Assistant Examiner—Curtis Kuntz
Attorney, Agent, or Firm—Blakely, Sokoloff, Taylor & Zafman

[57] ABSTRACT

A proximal cable-less communication system employs the physical placement of the units to each other to achieve information transfer. Local oscillators of each of the receivers are modulated and this modulated signal containing intelligence is received by other receivers due to the leakage radiation from the local oscillators.

10 Claims, 1 Drawing Sheet

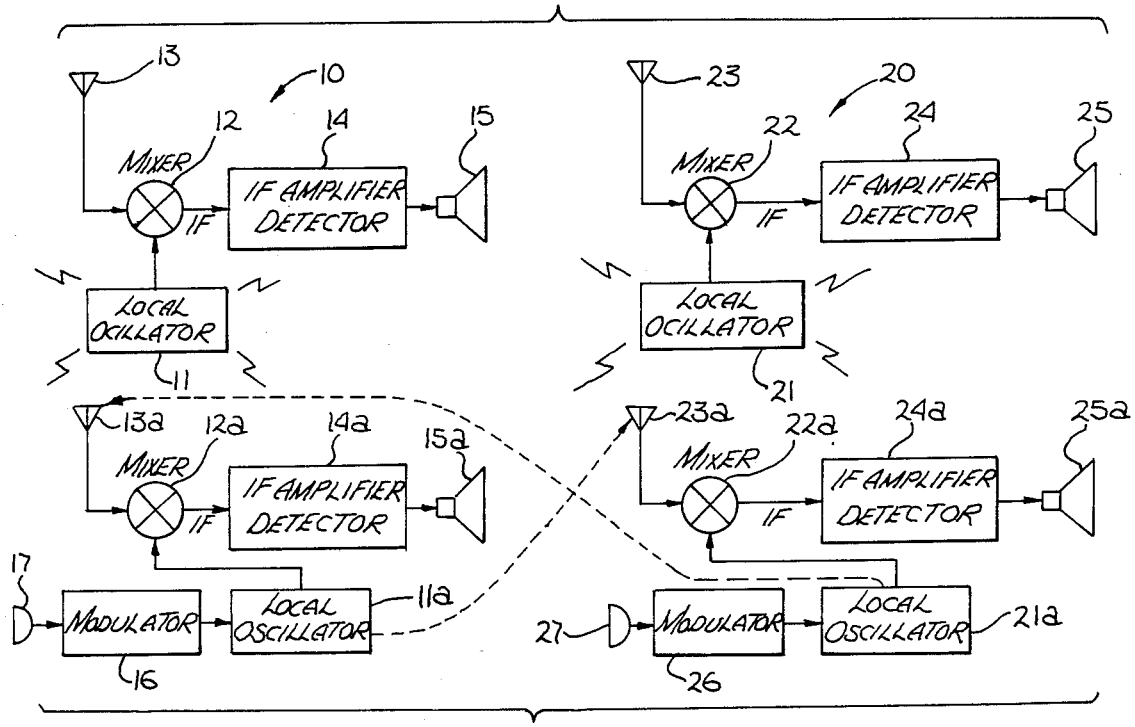
Fig. 1
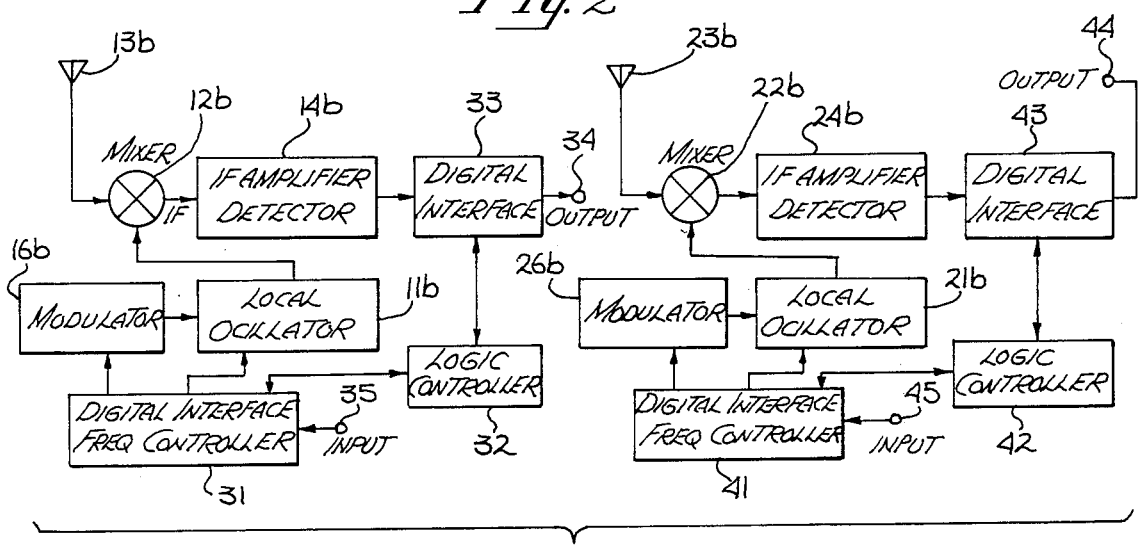
Fig. 2
Fig. 3

COORDINATED LOCAL OSCILLATOR RECEIVING SYSTEM

BACKGROUND OF THE INVENTION

1. Field of the Invention

The present invention relates to a field of proximal cableless communication systems.

2. Background of the Invention

Two-way voice and digital communication links are well-known in the prior art. One class of these communicating devices involves cordless communication systems which are proximately disposed from each other. Typically, they include at least two transceivers permitting them to communicate full-duplex at transmission power levels which allow units to be separated 500 feet or so from each other.

Basic superhetrodyne techniques are used to receive an incoming signal, mixing it with a local oscillator generated frequency to provide an intermediate frequency (IF). Then the IF is detected and the resulting signal, such as audio, is amplified for end use. In transmission, the same transceiver unit accepts an input, such as voice, and modulates a carrier frequency. The resulting modulation envelope is amplified in a power amplifier for transmission. When only short-range communication is desired, the transmission power levels are reduced in the above-described technique.

It is appreciated that transmission of signals between two short-range transceivers, such as in cordless telephone units or "walkie-talkies", still entail the necessity of communicating across an appreciable distance. To provide signal transfer across this distance, a nominal power level, albeit low, is still required for transmission of intelligence. Such transmission will require a similar circuit as described above. When communication at a much shorter distance is required, prior art practice has resorted to signal transfer over lines or cables. One such example is the use of a headset by connecting a headset to a base unit by cables. Such direct physical connections are used because of simplicity and cost savings. However, such physical connections significantly restrict the mobility of the user.

As described, the present invention permits full duplex two way communication within a limited range without the need for complicated circuitry to provide the transmission of signals. Further, the present invention permits significant increase in user mobility. At the same time, the limited range of the apparatus of the present invention results in improved security and isolation from interference due to the proximal range of the devices.

SUMMARY OF THE INVENTION

A proximal cable-less communication system using at least two receivers is described. A local oscillator of a first receiver is modulated to convey intelligence to a second receiver by leakage radiation from the first local oscillator. A local oscillator of the second receiver is also modulated and the first receiver receives the leakage radiation of the modulated second local oscillator.

The intermediate frequencies of the two receivers are set to the same frequency so that the same local oscillators can provide the mixing frequency to extract the information. By proximally disposing the two receivers to each other, two-way transfer of information is achieved.

BRIEF DESCRIPTION OF THE DRAWINGS

FIG. 1 shows a basic block diagram schematic of the apparatus of the preferred embodiment.

FIG. 2 shows a block diagram schematic of the apparatus of the preferred embodiment using a modulator.

FIG. 3 shows a block diagram schematic of an alternate embodiment for transferring digital data.

DETAILED DESCRIPTION OF THE INVENTION

A cable-less communication system which comprises at least two units for proximal communication with each other is described. In the following description, numerous specific details are set forth, such as specific frequencies, etc., in order to provide a thorough understanding of the present invention. However, it will be obvious to one skilled in the art that the present invention may be practiced without the specific details. In other instances, well-known circuits have not been described in detail in order not to unnecessarily obscure the present invention.

Referring to FIG. 1, two units 10 and 20 comprising the apparatus of the present invention is shown. In unit 10, a mixer 12 is coupled to antenna 13 to receive an incoming signal. Mixer 12 is also coupled to a local oscillator 11 to receive the local oscillator frequency. Mixer 12 mixes these two signals and generates an IF which is then coupled to an IF amplifier/detector block 14. The output of block 14 is provided to an audio amplifier 15. Most any local oscillator circuitry may be used for local oscillator 11. The preferred embodiment of the present invention provides for a fixed crystal controlled local oscillator which generates a fixed frequency for mixing in mixer 12. Mixer 12 combines the incoming signal from antenna 13 and the local oscillator frequency from local oscillator 11 and mixes the signals by a well-known superhetrodyne technique. The output of mixer 12 is fed to block 14 wherein the IF amplifier amplifies the incoming IF signal and then detects the intelligence from the IF signal. These techniques are well-known in the prior art. The output of block 14 is provided for end use. In this particular example, audio frequency is generated from block 14 for amplification in audio amplifier 15.

Unit 20 is comprised of antenna 23, mixer 22, local oscillator 21, IF amplifier/detector block 24 and audio amplifier 25. Unit 20 and its component parts are configured equivalently to unit 10 and also functions equivalently as unit 10. Although a particular configuration is shown, variations may exist without departing from the spirit and scope of the present invention. Such variations may entail the use of multiple IF amplifier stages; the insertion of a radio frequency (RF) amplifier between the antenna and the mixer to improve incoming signal sensitivity; the use of multiple audio stages; or even the use of more than one IF for multiple conversion. Units 10 and 20 are configured as a typical receiver and function comparably. Further, other input means can be used, instead of antenna 13 and 23, to couple signals into receiver units 10 and 20.

Full-duplex two-way communication is achieved by tuning local oscillator (LO) 11 to a first frequency and LO 21 to a second frequency. In this hypothetical example, LO 11 is tuned to a radio frequency of 46.0 megahertzs (MHz) and local oscillator 21 is tuned to 46.1 MHz. Antenna 23 is tuned to receive the LO 11 frequency of 46.0 MHz and antenna 13 is tuned to receive the LO 21 frequency of 46.1 MHz. The IF frequency for both units 10 and 20 are determined by the difference of the two LOs 11 and 21 frequencies. In this instance the IF is set to 100 KHz. (46.1–46.0 MHz). The frequencies of the LOs 11 and 21 are set so that their difference is equal to the IF of the receiving systems. The antenna 13 and 23 are tuned to receive the frequency of the opposing LOs 21 and 11, respectively. Because of their proximity to each other, antennae 13 and 23 are capable of receiving the radiation from the opposing LOs 11 and 21. Therefore, antenna 23 receives the 46.0 MHz radiation of LO 11 and mixes this signal with the 46.1 MHz signal from LO 21 in mixer 22 to provide a 100 KHz IF to block 24. Equivalently, antenna 13 receives the 46.1 MHz radiation from LO 21 and mixes this signal to the 46.0 MHz signal from LO 11 in mixer 12 to provide a 100 KHz IF to block 14. Further, by providing intelligence on LOs 11 and 21 signals, communication may be achieved between the units 10 and 20. One such communication is by turning LO 11 on and off, such as to functionally replicate a modulated continuous wave signal to the other unit.

Referring to FIG. 2, a LO 11a, mixer 12a, antenna 13a, IF/detector block 14a and audio amplifier 15a are shown configured equivalentely to unit 10 of FIG. 1. LO 21a, mixer 22a, antenna 23a, IF amplifier/detector block 24a and audio amplifier 25a are configured equivalently to unit 20 of FIG. 1. The reference numerals have been kept the same, but letters have been added, to provide for ease of understanding the various blocks between the drawings. In this instance input device 17 is coupled to modulator 16 which is then coupled to LO 11a.

Similarly, input unit 27 is coupled to modulator 26 which is then coupled to LO 21a in the second unit. Devices 17 and 27 are audio stimulation devices, such as a microphone, which couple audio signal to modulators 16 and 26, respectively. Modulator 16 modulates LO 11a at an audio rate. Similarly modulator 26 modulates LO 21a at an audio rate. Again LO 11a is set to 46.0 MHz and LO 21a is set to 46.1 MHz, wherein the IF is equal to the difference of 100 KHz. Modulator 16 when receiving an audio input from device 17 modulates the local oscillator frequency of 46.0 MHz at an audio rate. This modulated signal appears as a leakage radiation from LO 11a and is picked up by antenna 23A when antenna 23A is proximally located to LO 11a. In reverse, leakage radiation of a modulated 46.1 MHz frequency from LO 21a is picked up by antenna 13a. Therefore, when these two units are in a proximal position, audio communication between the units is achieved by the leakage radiation of modulated signals from each of the LOs 11a and 21a. It should be appreciated that intentionally allowing local oscillator leakage, as well as modulating a local oscillator, are not the usual practice of local oscillator use.

When frequency modulation is used, the output from the mixer to the detector will be the signal from the antenna, signal from the LO, or both. Since the detector does not distinguish one from the other, both will be detected and the intelligence from the LO will appear as a "sidetone" from the audio stage.

Referring to FIG. 3, two receiver units for use in transferring digital information is shown. Local oscillator 11b, mixer 12b, antenna 13b, and IF amplifier/detector block 14b of the first unit, as well as LO 21b, mixer 22b, antenna 23b and IF amplifier/detector block 24b are shown configured and functioning equivalently to similarly designated reference numerals of FIG. 1. However, in this instance digital interface 33 is coupled to receive the output of block 14b to process and output a digital signal on terminal 34. Also, digital interface 43 is coupled to receive the output of block 24b to provide a digital output at terminal 44. Again modulator 16b is coupled to LO 11b and modulator 26b is coupled to LO 21b similarly to the reference numerals of FIG. 2.

However, in the transfer of digital data, input 35 is coupled to digital interface/frequency controller block 31 and block 31 subsequently provides input to modulator block 16b, as well as providing certain control lines to local oscillator 11b. In the preferred embodiment, LO 11b is a phase lock loop with frequency agility to mate with the protocol requirements of the digital control system from the interface and frequency controller block 31. Equivalently, digital interface/frequency controller 41 accepts digital input on line 45 and subsequently provides the input to modulator 26b as well as phase lock loop control to LO 21b. Logic controller 32 provides the digital timing and control to interface 31 and interface 33, and logic controller 42 provides equivalent operation to controller 41 and interface 43. The use of a phase lock loop local oscillator and an appropriate detection system enables the apparatus to run narrow band to very wide band modulation which allows for subsequent high data rates. It is appreciated that analog, digital, or a combination of the two techniques can be implemented for transfer of intelligence between two equivalent receiver units of the present invention.

Because of the proximal usage of the present invention, to expand coverage to larger areas the apparatus can be expanded into a cellular system. A local repeater can be constructed for each frequency set and these repeaters can then be linked together and polled to provide the master control unit with the best signal. As one traverses through each zone the actual zone location of the apparatus unit would be known at the master control. A general cellular approach to communication is well-known in the prior art.

An alternate embodiment of the present invention utilizes an apparatus wherein the local oscillator frequency may be varied. Although the preferred embodiment uses a crystal controlled local oscillator, a varying frequency or a tuning local oscillator can be utilized to select various frequencies between the units. In such a configuration, multiple units may be implemented within a system wherein any one unit may select to communicate with any other unit by having each of their respective LOs tuned to a predetermined frequency.

Various applications can be implemented from the apparatus of the present invention. Such examples, but not limited to these, are remote telephone headsets and handsets, cable-less audio systems, and cable-less local area network for digital computer systems. The apparatus of the present invention is an improvement over the prior art. Prior art communication systems have implemented transceivers for the purpose of obtaining maximum range given a limited output power constraint. To achieve this end, prior art devices have implemented sophisticated transmitting circuitry. The apparatus of the present invention uses a plurality of receivers proximally disposed to transfer intelligence through leakage radiation. An object of the present invention, then, is to establish communication over a limited physical distance, approximately in a range under 100 feet, and accomplishing this end by the simplest of circuitry permitting for considerable cost savings.

Thus a coordinated local oscillator receiving system is described.

I claim:

1. In a proximal cable-less communication system, an apparatus having at least two receivers, comprising:
   a first receiver for receiving a first incoming signal having a second frequency, converting said first incoming signal to extract information, and providing a first output signal containing information;
   said first receiver including a first local oscillator for providing a first local oscillator signal having a first frequency which is used to mix with said first incoming signal such that a difference between said first frequency and said second frequency is selected for extraction of information in said first receiver;
   a second receiver for receiving a second incoming signal having a first frequency, converting said second incoming signal to extract information, and providing a second output signal containing information;
   said second receiver including a second local oscillator for providing a second local oscillator signal having a second frequency which is used to mix with said second incoming signal such that a difference between said second frequency and said first frequency is selected for extraction of information in said second receiver;
   said first local oscillator being modulated to provide a first modulated signal for conveying information;
   said first local oscillator signal being radiated from said first receiver as leakage radiation;
   said second local oscillator being modulated to provide a second modulated signal for conveying information;
   said second local oscillator signal being radiated from said second receiver as leakage radiation;
   said first and second receivers being proximately disposed to each other such that said first receiver receives leakage radiation of said second local oscillator as said first incoming signal and said second receiver receives leakage radiation of said first oscillator as said second incoming signal wherein information transfer between said two receivers is achieved.

2. The apparatus as defined in claim 1 wherein said first and second local oscillators include means to vary said local oscillator frequencies.

3. In a proximal cable-less communication system, an apparatus comprising:
   (a) a first unit comprising:
      a first antenna for receiving a first incoming signal;
      a first mixer coupled to said first antenna;
      a first local oscillator coupled to said first mixer for providing a first local oscillator signal having a first frequency;
      a first intermediate frequency (IF) amplifier coupled to said first mixer for amplifying a first IF;
      said first mixer for mixing said first incoming signal and said first local oscillator signal and selecting a difference frequency of said two mixed signals to provide said first IF to said first IF amplifier;
   (b) a second unit comprising:
      a second antenna for receiving a second incoming signal;
      a second mixer coupled to said second antenna;
      a second local oscillator coupled to said second mixer for providing a second local oscillator signal having a second frequency;
      a second IF amplifier coupled to said second mixer for amplifying a second IF;
      said second mixer for mixing said second incoming signal and said second local oscillator signal and selecting a difference frequency of said two mixed signals to provide said second IF to said second IF amplifier;
   (c) said first local oscillator having its first local oscillator signal modulated to provide said second incoming signal;
      said second local oscillator having its second local oscillator signal modulated to provide said first incoming signal;
      mutual placement of said first and second units causes each to receive leakage radiation of said modulated local oscillator signal of other said unit such that information transfer is achieved by reception of said incoming signals as said leakage radiation.

4. The apparatus as defined in claim 3, wherein said first and second IFs are equivalent such that said first and second local oscillator frequencies are separated by a value of said IF.

5. The apparatus as defined in claim 4, wherein said first and second local oscillators include means to vary said local oscillator frequencies.

6. The apparatus as defined in claim 5, including a plurality of units, each equivalent to said first and second units, such that any of said units can receive a selected incoming signal of another of said units by adjusting its local oscillator frequency to a value separated by a difference of its IF and said selected incoming frequency.

7. In a proximal cable-less two-way communication system, an apparatus comprising:
   (a) a first unit comprising:
      a first antenna for receiving a first incoming signal;
      a first mixer coupled to said first antenna;
      a first local oscillator coupled to said first mixer for providing a first local oscillator signal having a first frequency;
      a first intermediate frequency (IF) amplifier coupled to said first mixer for amplifying a first IF and detecting information conveyed in said first incoming signal;
      said first mixer for mixing said first incoming signal and said first local oscillator signal and selecting a difference by subtracting said first frequency from frequency of said first incoming signal to provide said first IF;
      a first input means coupled to said first local oscillator for modulating said first local oscillator signal;
      a first output means coupled to said IF amplifier for outputting said detected information from said first incoming signal;
   (b) a second unit comprising:
      a second antenna for receiving a second incoming signal;
      a second mixer coupled to said second antenna;
      a second local oscillator coupled to said second mixer for providing a second local oscillator signal having a second frequency;

a second IF amplifier coupled to said second mixer for amplifying a second IF and detecting information conveyed in said second incoming signal;

said second mixer for mixing said second incoming signal and said second local oscillator signal and selecting a difference by subtracting frequency of said second incoming signal from said second frequency to provide said second IF;

a second input means coupled to said second local oscillator for modulating said second local oscillator signal;

a second output means coupled to said second IF amplifier for outputting said detected information from said second incoming signal;

(c) wherein said modulated first local oscillator signal is said second incoming signal; and said modulated second local oscillator signal is said first incoming signal;

(d) said first and second units being physically disposed proximate to each other such that leakage radiation of said modulated local oscillator signal of each unit is received as said incoming signal by other said unit.

8. The apparatus as defined in claim 7 wherein said first and second input means are for inputting analog information.

9. The apparatus as defined in claim 8 wherein said first and second input means are for inputting digital information.

10. The apparatus as defined in claim 7 wherein said first and second IFs are the same.

* * * * *